(12) United States Patent  
Nakamura

(10) Patent No.: US 11,842,570 B2  
(45) Date of Patent: Dec. 12, 2023

(54) IMAGE PROCESSING APPARATUS, IMAGE PICKUP APPARATUS, IMAGE PROCESSING METHOD, AND STORAGE MEDIUM

(71) Applicant: CANON KABUSHIKI KAISHA, Tokyo (JP)

(72) Inventor: Keita Nakamura, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 332 days.

(21) Appl. No.: 17/307,213

(22) Filed: May 4, 2021

(65) Prior Publication Data

US 2021/0357675 A1    Nov. 18, 2021

(30) Foreign Application Priority Data

May 18, 2020   (JP) ................................ 2020-086731

(51) Int. Cl.
| | |
|---|---|
| *G06V 40/19* | (2022.01) |
| *G06V 40/18* | (2022.01) |
| *G02B 27/28* | (2006.01) |
| *G06V 10/60* | (2022.01) |
| *H04N 23/71* | (2023.01) |
| *H04N 23/76* | (2023.01) |
| *H04N 23/80* | (2023.01) |
| *G06V 10/147* | (2022.01) |
| *G06V 40/16* | (2022.01) |

(52) U.S. Cl.
CPC ......... *G06V 40/193* (2022.01); *G02B 27/286* (2013.01); *G06V 10/147* (2022.01); *G06V 10/60* (2022.01); *G06V 40/161* (2022.01); *G06V 40/172* (2022.01); *H04N 23/71* (2023.01); *H04N 23/76* (2023.01); *H04N 23/815* (2023.01)

(58) Field of Classification Search  
CPC .... G06V 40/193; G06V 40/172; G06V 10/60; G06V 40/161; G06V 10/147; H04N 23/76; H04N 23/71; H04N 23/815; G02B 27/286  
USPC ........................................................ 382/162  
See application file for complete search history.

(56) References Cited

U.S. PATENT DOCUMENTS

| | | | |
|---|---|---|---|
| 6,728,401 B1 * | 4/2004 | Hardeberg | .............. G06T 5/005 |
| | | | 348/576 |
| 9,082,068 B1 * | 7/2015 | Chapman | ................. H04N 1/62 |
| 2009/0304299 A1 * | 12/2009 | Motomura | ............. H04N 23/70 |
| | | | 382/254 |
| 2019/0213739 A1 * | 7/2019 | Ohba | ........................ G06T 7/74 |
| 2021/0042993 A1 * | 2/2021 | Tagra | ........................ G06T 7/50 |

FOREIGN PATENT DOCUMENTS

JP            6409088 B2   10/2018

* cited by examiner

*Primary Examiner* — Michael R Neff  
(74) *Attorney, Agent, or Firm* — ROSSI, KIMMS & McDOWELL LLP

(57) ABSTRACT

An image processing apparatus includes a separation unit configured to separate luminance information of each pixel in a processing area of an input image into an intrusion component and an object component, a determination unit configured to determine whether each of intrusion components is a first component or a second component, a processing unit configured to generate first information based on the first component, and an image generating unit configured to generate an output image based on the first information, the second component, and the object component.

11 Claims, 8 Drawing Sheets

| | | | | |
|---|---|---|---|---|
| f(2,2) | f(2,1) | f(2,0) | f(2,-1) | f(2,-2) |
| f(1,2) | f(1,1) | f(1,0) | f(1,-1) | f(1,-2) |
| f(0,2) | f(0,1) | f(0,0) | f(0,-1) | f(0,-2) |
| f(-1,2) | f(-1,1) | f(-1,0) | f(-1,-1) | f(-1,-2) |
| f(-2,2) | f(-2,1) | f(-2,0) | f(-2,-1) | f(-2,-2) |

SMOOTHING FILTER 41

| | | | | |
|---|---|---|---|---|
| I(2,2) | I(2,1) | I(2,0) | I(2,-1) | I(2,-2) |
| I(1,2) | I(1,1) | I(1,0) | I(1,-1) | I(1,-2) |
| I(0,2) | I(0,1) | I(0,0) | I(0,-1) | I(0,-2) |
| I(-1,2) | I(-1,1) | I(-1,0) | I(-1,-1) | I(-1,-2) |
| I(-2,2) | I(-2,1) | I(-2,0) | I(-2,-1) | I(-2,-2) |

PIXEL AREA 42

FIG. 4

| 1 | 4 | 1 | 4 |
|---|---|---|---|
| 2 | 3 | 2 | 3 |
| 1 | 4 | 1 | 4 |
| 2 | 3 | 2 | 3 |

FIG. 8

IMAGE PROCESSING APPARATUS, IMAGE PICKUP APPARATUS, IMAGE PROCESSING METHOD, AND STORAGE MEDIUM

BACKGROUND OF THE INVENTION

Field of the Invention

The present invention relates to an image processing apparatus and an image processing method.

Description of the Related Art

One conventionally known method removes, through image processing, intrusion information generated in an image when light from an intruder (foreign matter) outside of an angle of view of a camera is reflected on part of an object and enters an image sensor. Japanese Patent No. 6409088 discloses a method of removing only a specular reflection component by separating, utilizing polarization information acquired by a polarization sensor, an image component into a specular reflection component (intrusion information) and a diffuse reflection component (object information).

The specular reflection component includes not only information on the intruder but also information on a texture of the object. Therefore, if the specular reflection component is removed by the method disclosed in Japanese Patent No. 6409088, the texture of the object changes.

SUMMARY OF THE INVENTION

The present invention provides an image processing apparatus, an image pickup apparatus, an image processing method, and a storage medium, each of which can process intrusion information while restraining a texture of an object in an image from changing.

An image processing apparatus according to one aspect of the present invention includes one or more processors causing the image processing apparatus to function as a separation unit configured to separate luminance information of each pixel in a processing area of an input image into an intrusion component and an object component, a determination unit configured to determine whether each of intrusion components is a first component or a second component, a processing unit configured to generate first information based on the first component, and an image generating unit configured to generate an output image based on the first information, the second component, and the object component.

An image pickup apparatus having the above image processing apparatus also constitutes another aspect of the present invention. An image processing method corresponding to the above image processing apparatus also constitutes another aspect of the present invention. A non-transitory computer-readable storage medium storing a program that causes a computer to execute the image processing method also constitutes another aspect of the present invention.

Further features of the present invention will become apparent from the following description of exemplary embodiments with reference to the attached drawings.

BRIEF DESCRIPTION OF THE DRAWINGS

FIG. 4 illustrates a smoothing filter in each embodiment and a pixel area for convoluting the smoothing filter.

FIG. 8 illustrates a pixel array of an image sensor in the image pickup apparatus according to the third embodiment.

DESCRIPTION OF THE EMBODIMENTS

Referring now to the accompanying drawings, a detailed description will be given of embodiments according to the present invention.

Figure 1:
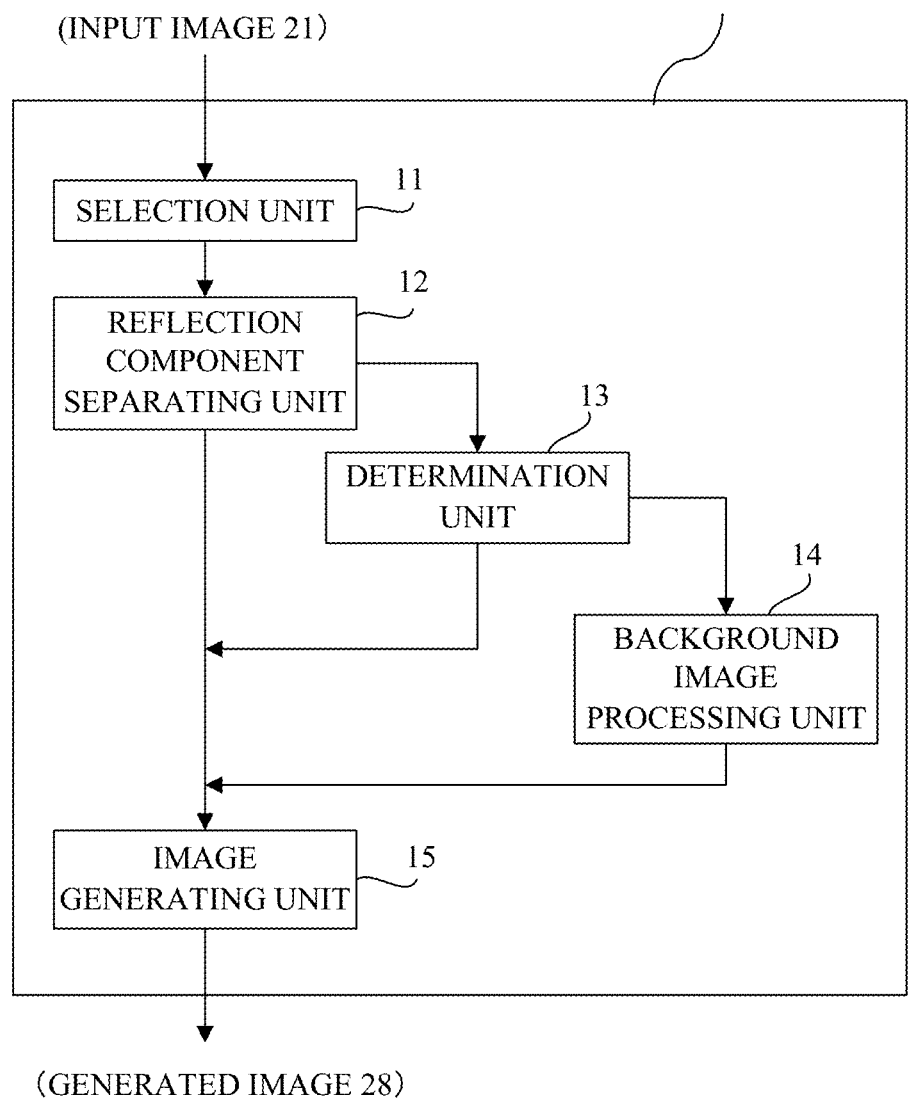
FIG. 1 is a block diagram of an image processing apparatus according to each embodiment.
Figure 2:
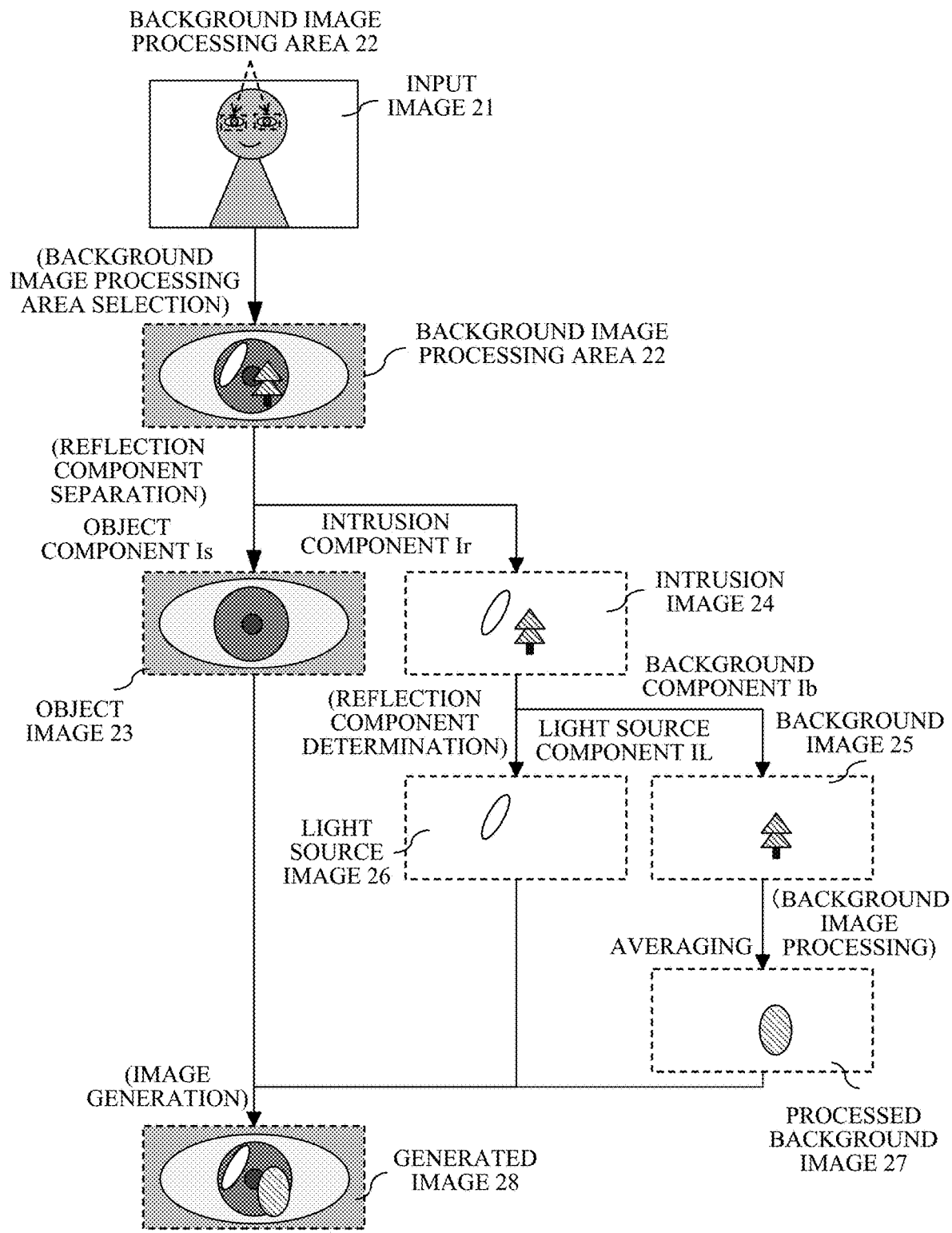
FIG. 2 is a schematic diagram of an image processing method according to each embodiment.

Referring now to FIGS. 1 and 2, a description will be given of an image processing apparatus and an image processing method according to each embodiment. FIG. 1 is a block diagram of an image processing apparatus 1. FIG. 2 is a schematic diagram of an image processing method implemented by the image processing apparatus 1.

The image processing apparatus 1 includes a selection unit 11, a reflection component separating unit (separation unit) 12, a determination unit 13, a background image processing unit (processing unit) 14, and an image generating unit 15. The selection unit 11 selects part of an area of an input image 21 input to the image processing apparatus 1 as a background image processing area (processing area) 22. The area selected as the background image processing area 22 may one or more areas. The background image processing area 22 is an area including a target that is likely to intrude on an image. An example of the target that is likely to intrude on an image includes an eye, an eyeglass, a window glass, and a water surface. In the example illustrated in FIG. 2, the selection unit 11 selects two areas including eyes indicated by broken lines in the input image 21 as the background image processing area 22.

The reflection component separating unit 12 separates luminance information I (luminance component) of each pixel in the background image processing area 22 into an object component Is and an intrusion component Ir. In this example, the luminance component that mainly contains information of the object itself will be referred to as the object component is, and the luminance component that mainly contains information of the intruder, such as a surrounding foreign matter and a light source, will be referred to as the intrusion component Ir. An image including the object component Is will be referred to as an object image 23, and an image including the intrusion component Ir will be referred to as an intrusion image 24.

As a method of separating the luminance information I into the object component Is and the intrusion component Ir, for example, a separating method using polarization information is known. The polarization information can be calculated from a plurality of polarization images captured by changing the direction of a polarization element that is configured to selectively transmit light in a specific polarization direction and mounted in front of a camera or a lens. A plurality of polarization images can also be acquired by using a polarization sensor in which a plurality of polarization elements having different directions are attached to each pixel of the sensor.

Figure 3:
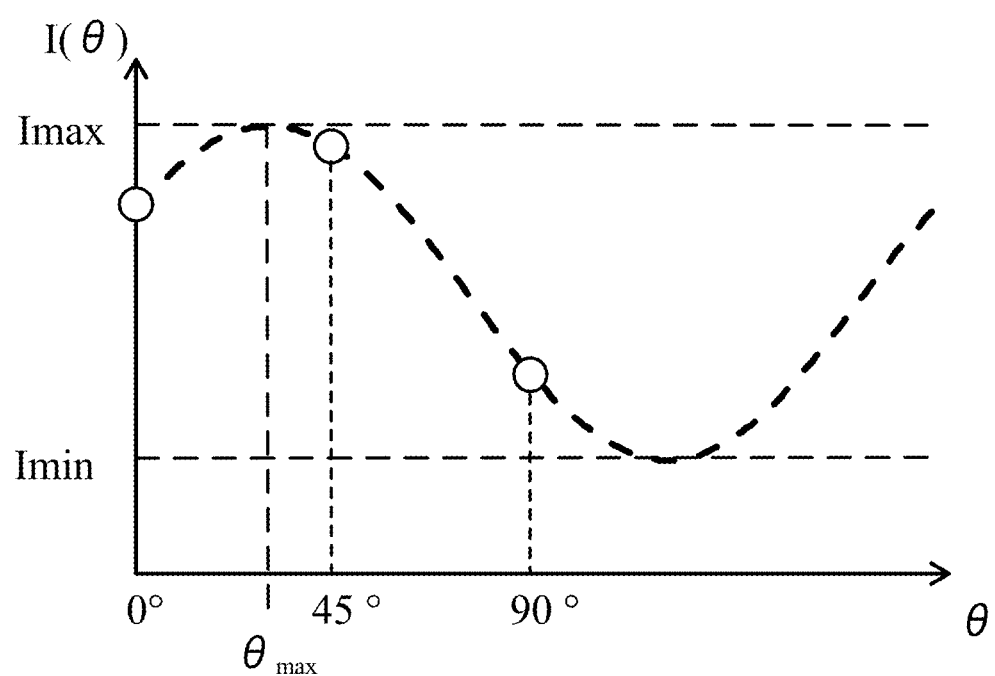
FIG. 3 illustrates an approximate curve obtained from three pieces of luminance information in each embodiment.

A relationship between the luminance information I of the pixels at the same positions in a plurality of polarization images and an angle (direction) θ of the polarization element when each polarization image is acquired can be approximated by a cosine function. FIG. 3 illustrates three pieces of luminance information I (white circles) of pixels located at the same positions in polarization images acquired at θ=0 degrees, 45 degrees, and 90 degrees, and an approximate curve (broken line) obtained from the three pieces of luminance information I. The approximate curve estimated from the luminance information of the polarization image is expressed by the following expression (1) using a minimum value Imin, a maximum value Imax, and an angle (direction) θmax of the polarization element that maximizes the curve:

$$I(\theta)=(I_{max}-I_{min})\cos^2(\theta-\theta_{max})+I_{min} \quad (1)$$

Imin, Imax, and θmax are collectively polarization information. The polarization information is not limited to the three sets of Imin, Imax, and θmax as long as it is a coefficient that uniquely expresses the expression (1). For example, a difference Imax−Imin between Imax and Imin may be used instead of Imax, and the angle (direction) θmin of the polarization element that minimizes the curve may be used instead of θmax.

In general, specular reflection light on the object surface has a high polarization degree, and diffused reflection light has a low polarization degree. The diffused reflection light is an object component that mainly contains the information on the object itself, and the specular reflection light is an intrusion component that mainly contains the information on the intruder such as a surrounding foreign matter and a light source. That is, the intrusion component changes according to the direction of the polarization element, but the object component is substantially constant regardless of the direction of the polarization element. Therefore, it can be estimated that the minimum value Imin, which is a component that does not depend on the angle (direction) θ of the polarization element, is the object component Is, and the other components are the intrusion component Ir.

A separating method using a dichroic reflection model has been also known. The dichroic reflection model can represent light reflected from the foreign matter by the sum of the object component Is of the intruder color and the intrusion component Ir of the light source color. Thus, by estimating the light source color and the intruder color, each color component can be separated into the object component Is and the intrusion component Ir.

Another method includes a method that uses parallax information. The parallax information is obtained from a plurality of images of the same object captured by cameras located at different positions. In the images captured by the cameras located at different positions, the relative positions of the background image processing area 22, the object image 23, and the intrusion image 24 in the image are different, and a shift amount between these positions is obtained as a parallax. The parallax between the background image processing area 22 and the object image 23 is substantially equivalent, but the parallax of the intrusion image 24 is different from that of the background image processing area 22, and the relative position of the intrusion image 24 relative to the background image processing area 22 changes. Therefore, it can be estimated that the component whose relative position does not change relative to the background image processing area 22 is the object component Is, and the component whose relative position changes is the intrusion component Ir.

The determination unit 13 determines whether the intrusion component Ir is the background component Ib or the light source component IL. For example, the determination unit 13 determines that the intrusion component Ir mainly including information on the surrounding foreign matter is the background component Ib, and that the intrusion component Ir mainly including light source information is the light source component IL. Further, the image including the background component Ib will be referred to as the background image 25, and the image including the light source component IL will be referred to as the light source image 26.

As a criterion for determining whether the intrusion component Ir is the background component Ib or the light source component IL, for example, the luminance information and the color information of the intrusion component Ir (intrusion image 24) can be used. Further, the determination may be made based on the shape of the intrusion component Ir (intrusion image 24). The determination based on the luminance information is made, for example, by the magnitude of the luminance value. In general, the intrusion light source image has a larger luminance value than that of the image of the surrounding foreign matter. Therefore, the determination unit 13 determines that a relatively large component in the intrusion component Ir is the light source component IL. For example, the determination unit 13 determines that a component larger than the average value of the intrusion component Ir in the background image processing area 22 is the light source component IL. That is, the determination unit 13 determines that the intrusion component Ir is the background component Ib when the luminance value is smaller than the predetermined value, and that the intrusion component Ir is the light source component IL when the luminance value is larger than the predetermined value. Alternatively, the determination unit 13 may determine that the intrusion component Ir of the pixel whose luminance information of the pixel obtained by combining the intrusion component Ir and the object component Is is 80% or more of the saturation luminance value is the light source component IL. In the determination using the color information, the determination unit 13 determines, for example, that the intrusion component Ir having the same color information as the estimated or designated light source color is the light source component IL.

These criteria are illustrative, and any criteria can be used. The standard may be given in advance, but may be set as appropriate. Although only the information of each pixel may be used for the determination of the intrusion component Ir of each pixel, the determination may use the information of neighboring pixels.

The background image processing unit 14 processes the background image 25 and generates the processed background image 27. Assume that a processed background component Ib' is luminance information of each pixel of the processed background image 27. The processing in the background image processing unit 14 includes, for example, a removal of a high frequency component from the background image 25 corresponding to the background component (a reduction of the resolution), a removal of the luminance information (a reduction of a luminance value), a change of color information, a replacement with another image, mosaic processing, etc.

A method of removing the high frequency component includes, for example, smoothing processing that convolutes a smoothing filter into an image. The smoothing processing sets the average value of the values of the peripheral pixels and the weighted average value to a value of each pixel, reduces a difference between the neighboring pixels, and removes the high frequency component. FIG. 4 illustrates, in an example, a smoothing filter 41 having 5×5 pixels and a pixel area 42 having 5×5 pixels which is part of an image in which the smoothing filter 41 is convolved. A pixel value f(i, j) of the filter and a pixel value I(i, j) of the image are illustrated in each pixel of the smoothing filter 41 and the pixel area 42, respectively, and (i, j) represents a pixel position. The pixel value I'(0,0) of the pixel at the position (0,0) obtained by convolving the smoothing filter 41 is expressed by the following expression (2).

$$I'(0,0) = \Sigma_{i=-2}^{2} \Sigma_{j=-2}^{2} [f(i,j) \times I(i,j)] \quad (2)$$

The pixel value f(i, j) of the filter may be the same among pixels, or may be different among pixels as in the Gaussian filter.

Another method includes a method that generates an image in which a high frequency component is removed by Fourier-transforming an image to obtain information for each spatial frequency, by setting the high frequency component to 0, and then by performing an inverse transform. For example, color information can be removed by making an image monochrome, or luminance information can be removed by reducing a luminance value of each pixel. A replacement with another image can be performed by selecting and replacing an image close to the background image 25 from among an image list prepared in advance, or by replacing the background image with a retouched image.

The background image processing unit 14 may carry out the above processing for one or more areas. It may carry out the same processing for the entire background image 25, or different processing for each part of the background image 25.

The image generating unit 15 combines the object image 23, the light source image 26, the processed background image 27 in the background image processing area 22, and the input image in the areas other than the background image processing area 22, and generates the generated image (output image) 28. The luminance information of each pixel in the generated image 28 is the luminance information I of the input image in the area other than the background image processing area 22, and the sum of the object component Is, the light source component IL, and the processed background component Ib' in the background image processing area 22.

The generated image 28 may cause a problem in which an edge is generated near the boundary of the background image processing area 22 depending on the presence or absence of processing. In such a case, the generated image 28 may be generated by setting a transition area near the boundary of the background image processing area 22, and by setting the luminance information to an average of the luminance information I of the input image and the sum of the object component Is, the light source component IL, and the processed background component Ib'.

The generated image 28 generated by the image processing apparatus 1 is an image in which the information of the surrounding foreign matter is removed while the information of the object and the intrusion light source is maintained. Therefore, it is possible to remove the information of the surrounding foreign matter while suppressing a loss of the information of the object and a change of the texture. Each embodiment may execute, through a program or the like, an image processing method equivalent to the image processing performed by the image processing apparatus 1.

First Embodiment

Figure 5:
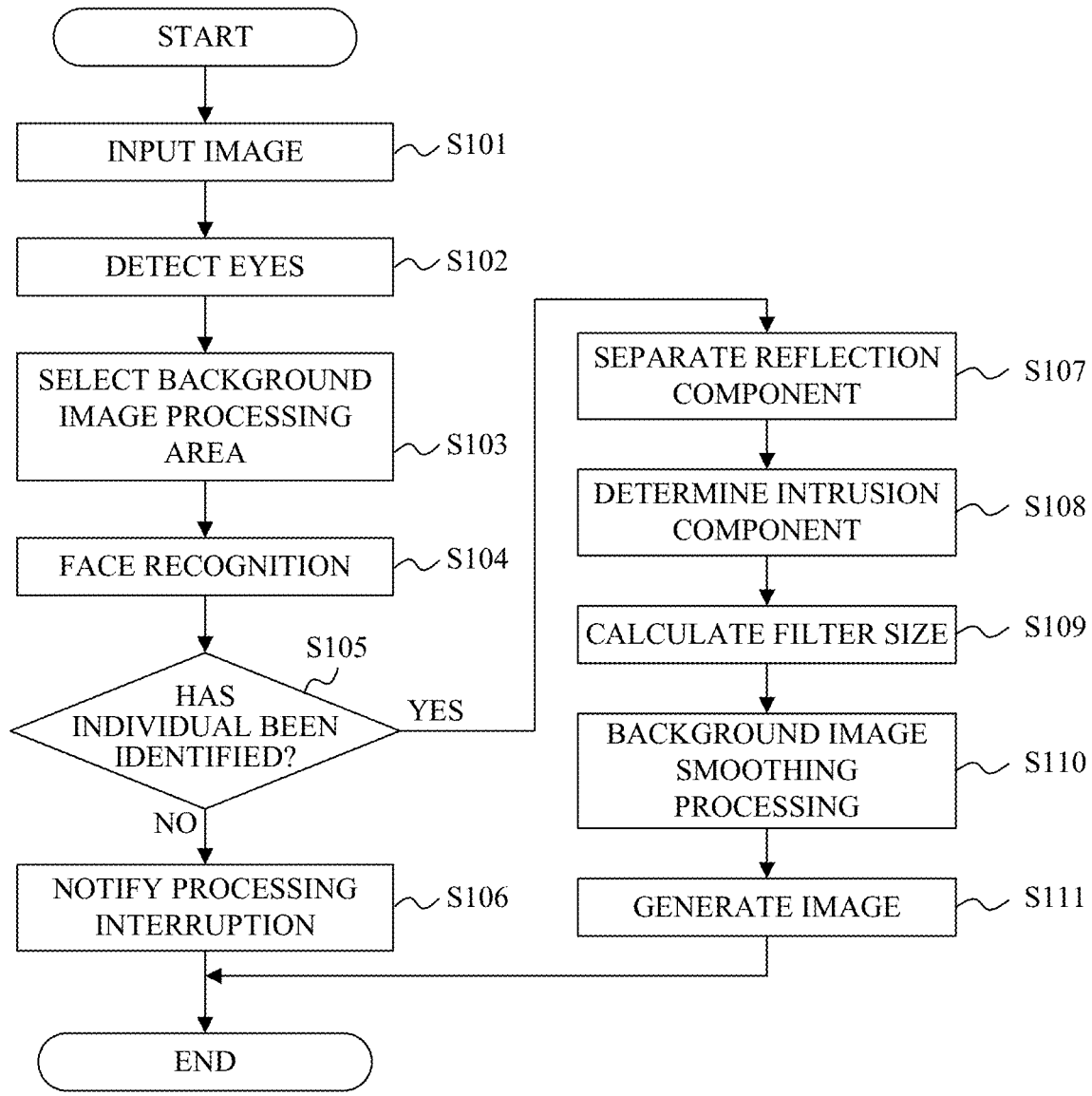
FIG. 5 is a flowchart of an image processing method according to a first embodiment.

Referring now to FIG. 5, a description will be given of an image processing method according to a first embodiment of the present invention. FIG. 5 is a flowchart of the image processing method according to this embodiment. The image processing method according to this embodiment is executed by the selection unit 11, the reflection component separating unit 12, the determination unit 13, the background image processing unit 14, or the image generating unit 15 in the image processing apparatus 1 described with reference to FIG. 1.

First, in the step S101, the selection unit 11 in the image processing apparatus 1 inputs an image (acquires the input image 21). Next, in the step S102, the selection unit 11 detects an eye in the object in the input image 21. Next, in the step S103, the selection unit 11 selects an area including the eyes detected from the input image 21 as the background image processing area 22. Various known techniques can be used for a method for detecting the eyes from the object.

Next, in the step S104, the reflection component separating unit 12 performs a face recognition. Next, in the step S105, the reflection component separating unit 12 determines whether or not an individual can be identified by the face recognition. If the individual cannot be identified, the flow proceeds to step S106, and the image processing apparatus 1 notifies that the image processing has been interrupted. The image processing apparatus 1 may make a display, for example, that notifies an external display device that the processing has been interrupted. On the other hand, if the individual can be identified, the flow proceeds to the step S107.

In the step S107, the reflection component separating unit 12 separates the luminance information of each pixel in the background image processing area 22 into the intrusion component Ir and the object component Is (that is, the eye component) based on the dichroic reflection model. In this embodiment, the reflection component separating unit 12 separates the object component Is of the intruder color from the intrusion component Ir of the light source color by providing as the intruder color the eye color information associated with the individual identified by the face recognition.

Next, in the step S108, the determination unit 13 determines whether the intrusion component Ir is the background component Ib (first component) or the light source component IL (second component). In this embodiment, the determination unit 13 determines that the intrusion component Ir of the pixel whose luminance value is half or more of the maximum value in the background image processing area 22 is the light source component IL, and the other intrusion component Ir is the background component Ib.

Next, in the step S109, the background image processing unit (processing unit) 14 calculates the size of the filter. Next, in the step S110, the background image processing unit 14 performs smoothing processing for the background image 25 and removes a high frequency component. That is, the background image processing unit 14 generates a processed background image 27 (first information) based on the background component Ib.

The background image processing unit 14 performs smoothing processing for the background image 25 and removes a high frequency component. This embodiment performs the smoothing processing by convolving a smoothing filter having a filter size of F1×F2 pixels and the same pixel values into the background image 25. The filter sizes F1 and F2 are odd values, respectively, and are determined based on the size of the background image processing area 22. The size of the background image processing area 22 is expressed by N1×N2 rectangular pixels having the smallest area among the rectangles circumscribing the background image processing area 22. At this time, the filter sizes F1 and F2 are determined so that N1/F1 and N2/F2 are approximately 10. By setting the filter size as described above, the image after the smoothing processing has a resolution that is approximately equal to a resolution when the inside of the background image processing area 22 is set to approximately 10×10 pixels, and it becomes difficult to distinguish the intruder. In the smoothing processing, the background image processing area 22 is rotated so that the two sides of the circumscribed rectangle coincide with the pixel arrangement direction of the image, and then the smoothing filter is convoluted with the background image 25. Thereafter, the smoothed background image 25 is reversely rotated to generate the processed background image 27.

Next, in the step S111, the image generating unit 15 generates the generated image 28 by combining a processed background image 27 in the background image processing area 22, a light source component IL (light source image 26), an object component Is (object image 23), and an input image in an area other than the background image processing area 22.

In comparison with the input image 21, the generated image 28 obtained by the image processing apparatus 1 according to this embodiment has no high frequency component of the background image 25, which makes it difficult to discriminate the intruder. On the other hand, since the object image 23 and the light source image 26 do not change, the object information is not lost and the texture can be restrained from changing.

Second Embodiment

Figure 6:
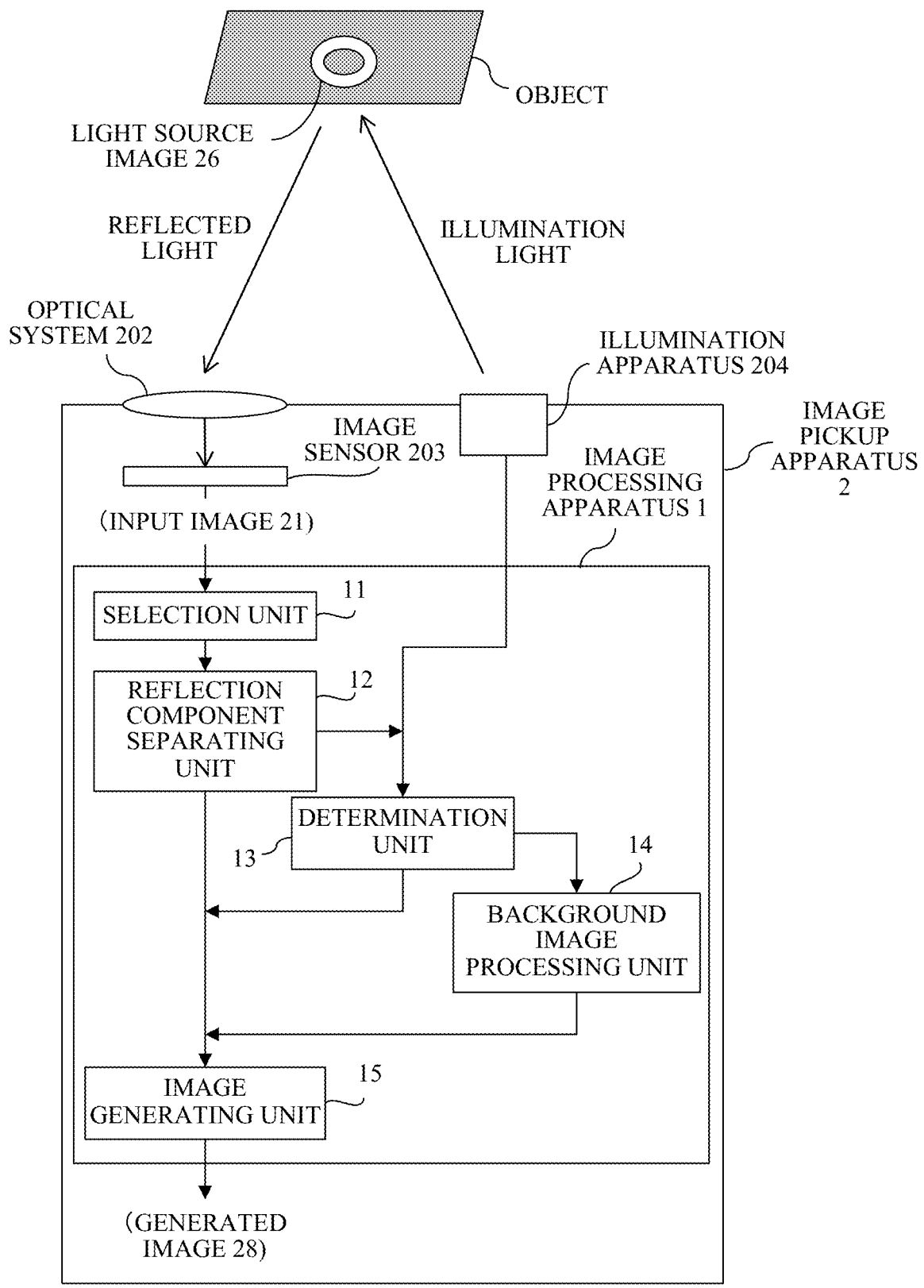
FIG. 6 is a block diagram of an image pickup apparatus according to a second embodiment.

Referring now to FIG. 6, a description will be given of an imaging apparatus according to a second embodiment of the present invention. FIG. 6 is a block diagram of an image pickup apparatus 2 according to this embodiment. The image pickup apparatus 2 includes an image processing apparatus 1, an optical system 202, an image sensor 203, and an illumination apparatus 204. The image sensor 203 receives the light from the optical system 202 and generates an input image. In the image pickup apparatus 2, illumination light from the illumination apparatus 204 reflected by the object is imaged on the image sensor 203 by the optical system 202, and the image obtained from the image sensor 203 is input as an input image 21 to the image processing apparatus 1.

This embodiment uses a white ring-shaped illumination for the illumination apparatus 204 and inputs, as information of the illumination apparatus 204, color information and shape information of the illumination light into the determination unit 13 in the image processing apparatus 1. The determination unit 13 uses the color information and the shape information of the intrusion image 24 for one of the determination criteria. That is, the determination unit 13 extracts an image having a shape close to the color information (white) and the shape information (ring shape) of the illumination light from the intrusion image 24 corresponding to the intrusion component Ir, and determines that part of the extracted image which has a luminance value equal to or greater than a reference value (predetermined value) is the light source image 26. By utilizing the light source information as known information for determining the reflection component, the light source component intentionally added by the illumination apparatus 204 can be more accurately determined. Thereby, a generated image 28 having a texture that is close to the intended texture can be obtained.

The background image processing unit 14 in the image processing apparatus 1 according to this embodiment replaces the background image 25 with another image. As the image to be replaced, an image close to the background image 25 can be selected from an image list prepared in advance. The replacement processing can provide processing of enlarging/reducing the image size of the image to be replaced according to the size of the background image processing area 22 and processing of adjusting the overall luminance to the luminance of the background image 25. By replacing the background image 25 with another image, the information possessed by the background image 25 can be erased, and an information leakage can become less likely.

Third Embodiment

Figure 7:
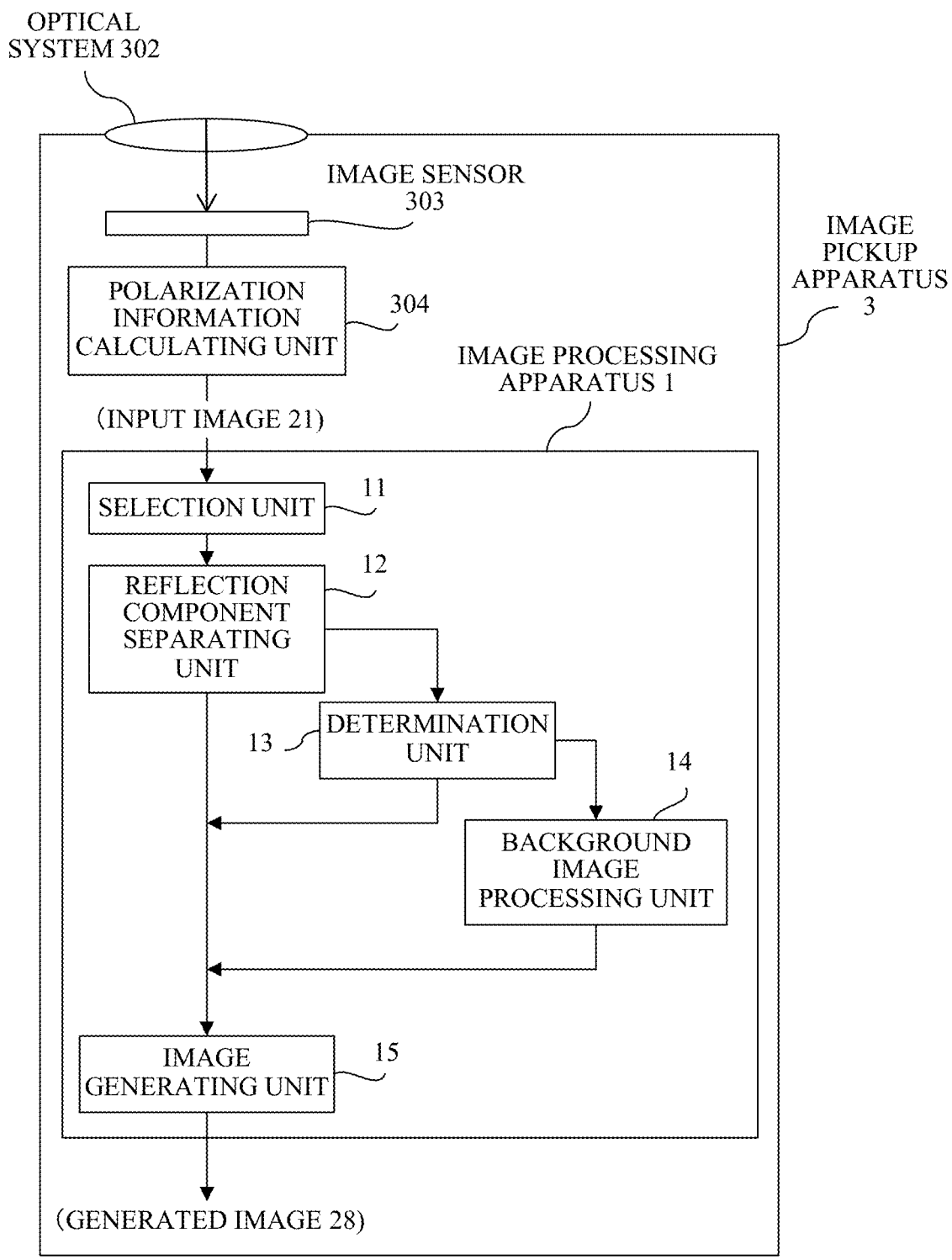
FIG. 7 is a block diagram of an image pickup apparatus according to a third embodiment.
Figure 8:
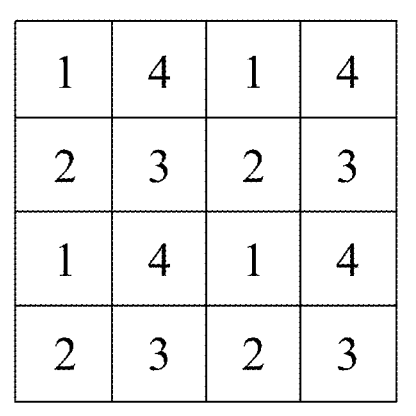

Referring now to FIGS. 7 and 8, a description will be given of an image pickup apparatus according to a third embodiment of the present invention. FIG. 7 is a block diagram of an image pickup apparatus 3 according to this embodiment. FIG. 8 illustrates a pixel array of an image sensor 303 according to this embodiment. The image pickup apparatus 3 includes an image processing apparatus 1, an optical system 302, the image sensor 303, and a polarization information calculating unit (calculation unit) 304. The image sensor 303 receives light from the optical system 302.

The optical system 302 forms an image of the reflected light from the object on the image sensor 303, and the image obtained from the image sensor 303 is input into the polarization information calculating unit 304. In this embodiment, the image sensor 303 is a polarization image sensor in which a plurality of polarization elements having angles (directions) of 0 degrees, 45 degrees, 90 degrees, and 135 degrees are arranged in each pixel. The numbers 1, 2, 3, and 4 in each pixel in FIG. 8 represent the angles (0 degrees, 45 degrees, 90 degrees, 135 degrees) of the polarization elements in each pixel, respectively.

The polarization information calculating unit 304 interpolates the information obtained by the pixels having the same direction of the polarization element of the image sensor 303, and obtains the luminance information acquired in the directions of four different polarization elements in each pixel. Then, the polarization information calculating unit 304 obtains an approximate curve expressed by the expression (1) in each pixel based on the obtained four luminance values and the angle (direction) of the polarization element obtained from each luminance value. In this embodiment, the polarization information calculating unit 304 calculates, as polarization information, the minimum value Imin that minimizes the sum of squares of the difference in the luminance values calculated from the expression (1), the maximum value Imax, and angle θmin, based on the four obtained luminance values and the angle of the polarization element that obtained each luminance value. The image including the polarization information calculated by the polarization information calculating unit 304 is input as the input image 21 into the image processing apparatus 1.

The selection unit 11 selects the background image processing area 22 using an image consisting of Imin information regarding the minimum value Imin. Since the image consisting of Imin information mainly includes the information of the object itself, the detection accuracy is unlikely to lower due to the intrusion in detecting a target that is likely to cause an intrusion, such as an eye and a window glass. The reflection component separating unit 12 sets the Imin information to the object component Is and the Imax−Imin information to the intrusion component Ir. The determination unit 13 determines that a component having a maximum value Imax equal to or less than the reference value (predetermined value) is the background component Ib. The background image processing unit 14 performs processing that sets the luminance information of the background image 25 to 0. That is, the background image processing unit 14 generates a processed background image 27 in which the processing background component Ib' in each pixel is set to 0.

The image generating unit 15 generates a generated image 28 based on the object image 23, the light source image 26, the processed background image 27 in the background image processing area 22, and the input image outside the background image processing area 22. The polarization information in the background image processing area 22 is Imin=Is, Imax=Is+IL, and θmax is the same as θmax of the input image. In this embodiment, the luminance information I of each pixel of the generated image 28 can be calculated by the following expression (3) using three coefficients k1, k2, and k3:

$$I = k_1(I_{max} - I_{min})\cos^2(k_2 - \theta_{max}) + k_3 I_{min} \quad (3)$$

The texture of the object can be changed by generating an image by changing the three coefficients k1, k2, and k3. The three coefficients k1, k2, and k3 may be the same or different from one another among all pixels.

As described above, the image pickup apparatus 3 according to this embodiment includes the polarization information calculating unit 304 configured to calculate polarization information from a plurality of polarization images acquired by a plurality of polarization elements arranged in different directions from one another. The reflection component separating unit 12 separates, based on the polarization information, a component determined not to depend on the directions of the plurality of polarization elements as the object component Is and a component different from the object component Is as the intrusion component Ir.

In comparison with the input image 21, in the image obtained by the image processing apparatus 1 according to this embodiment, the luminance information of the background image 25 is 0 and the information of the intruder is lost. By using the polarization information, the texture of the object can be changed, and an image having a more desired texture can be obtained.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), microprocessing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide an image processing apparatus, an image pickup apparatus, an image processing method, and a storage medium, each of which can process intrusion information while restraining a texture of an object in an image from changing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-086731, filed on May 18, 2020, which is hereby incorporated by reference herein in its entirety.

What is claimed is:

1. An image processing method comprising the steps of:
    separating luminance information of each pixel in a processing area of an input image into a specular reflection light component and a diffused reflection light component;
    determining whether each of the specular reflection light components is a first component or a second component;
    generating first information by one of:
        lowering a resolution of a background image corresponding to the first component;
        reducing a luminance value of the background image corresponding to the first component; or
        replacing a background image corresponding to the first component with another image; and
    generating an output image based on the first information, the second component, and the diffused reflection light component.

2. The image processing method according to claim 1, further comprising the step of:
    selecting part of the input image as the processing area, wherein the selecting selects an area including an eye detected from the input image as the processing area.

3. The image processing method according to claim 1, wherein the determining determines whether each of the specular reflection light components is the first component or the second component, using the luminance information of the respective specular reflection light component.

4. The image processing method according to claim 1, wherein:
    the luminance information includes a luminance value each of the specular reflection light components and
    the determining determines that each of the specular reflection light intrusion component is:
        the first component in a state where the luminance value is smaller than a predetermined value; and
        the second component in a state where the luminance value is larger than the predetermined value.

5. The image processing method according to claim 1, wherein the determining determines whether each of the specular reflection light components is the first component or the second component, using color information of the respective specular reflection light component.

6. The image processing method according to claim 1, wherein the determining determines whether each of the specular reflection light components is the first component or the second component, using a shape of the respective specular reflection light component.

7. The image processing method according to claim 1, further comprising the step of:
calculating polarization information from a plurality of polarization images acquired by a plurality of polarization elements arranged in different directions,
wherein the separating separates the diffused reflection light component, which is determined not to depend on directions of the plurality of polarization elements, and the specular reflection light component, which is different from the diffused reflection light component.

8. The image processing method according to claim 1, wherein:
the generating generates the first information by reducing the luminance value of the background image corresponding to the first component, and
the determining determines whether each of the specular reflection light components is the first component or the second component based on a predetermined value of the luminance value.

9. The image processing method according to claim 1, wherein:
the generating generates the first information by replacing a background image corresponding to the first component with another image, and
the method further comprises generating the another image using a smoothing filter.

10. An image processing apparatus comprising:
one or more memories storing instructions; and
one or more processors or circuits configured to:
separate luminance information of each pixel in a processing area in an input image into a specular reflection light component and a diffused reflection light component;
determining whether each of the specular reflection light components is a first component or a second component;
generating first information by one of:
lowering a resolution of a background image corresponding to the first component;
reducing a luminance value of the background image corresponding to the first component; or
replacing a background image corresponding to the first component with another image; and
generating an output image based on the first information, the second component, and the diffused reflection light component.

11. A non-transitory computer-readable storage medium storing a program executable by a computer to execute an image processing method comprising the steps of:
separating luminance information of each pixel in a processing area of an input image into a specular reflection light component and a diffused reflection light component;
determining whether each of the specular reflection light components is a first component or a second component;
generating first information by one of:
lowering a resolution of a background image corresponding to the first component;
reducing a luminance value of the background image corresponding to the first component; or
replacing a background image corresponding to the first component with another image; and
generating an output image based on the first information, the second component, and the diffused reflection light component.

* * * * *